United States Patent [19]

Wang

[11] Patent Number: 4,763,031
[45] Date of Patent: Aug. 9, 1988

[54] ELECTRIC MOTOR AND GEARBOX UNIT AND COMPONENT PARTS THEREOF

[75] Inventor: Patrick S. Wang, Repulse Bay, Hong Kong

[73] Assignee: Johnson Electric Industrial Manufactory Limited, Chai Wan, Hong Kong

[21] Appl. No.: 891,923

[22] Filed: Jul. 30, 1986

[30] Foreign Application Priority Data

Feb. 6, 1986 [GB] United Kingdom ............... 8602945

[51] Int. Cl.$^4$ ............................................. H02K 7/10
[52] U.S. Cl. ...................................... 310/83; 310/50; 310/62; 310/89; 310/112; 74/801
[58] Field of Search ..................... 310/62, 63, 83, 89, 310/112, 91, 90, 47, 50; 74/445, 801

[56] References Cited

U.S. PATENT DOCUMENTS

| | | |
|---|---|---|
| 1,636,670 | 7/1927 | Shaw et al. |
| 2,730,635 | 1/1956 | McCabe ............... 310/83 X |
| 2,989,995 | 6/1961 | Happe ................... 310/83 |
| 3,421,390 | 1/1969 | Lohr ...................... 74/801 |
| 3,688,138 | 8/1972 | Jacyno ................... 310/83 |
| 4,079,275 | 3/1978 | Fu ......................... 310/83 |
| 4,227,104 | 10/1980 | Hamman ............... 310/83 |
| 4,369,387 | 1/1983 | Haar ...................... 310/83 |
| 4,399,380 | 8/1983 | Hirano ................... 310/83 |
| 4,454,437 | 6/1984 | Tanaka .................. 310/83 |
| 4,520,285 | 5/1985 | Isozumi ................. 310/83 |
| 4,522,080 | 6/1985 | Santi ..................... 74/445 |

FOREIGN PATENT DOCUMENTS

| | | |
|---|---|---|
| 918612 | 2/1947 | France . |
| 2499653 | 8/1982 | France . |
| 2515892 | 5/1983 | France . |
| 2108627 | 5/1981 | United Kingdom . |
| 2107424 | 4/1983 | United Kingdom . |
| 2107425 | 4/1983 | United Kingdom . |
| 2109893 | 6/1983 | United Kingdom . |
| 2117485 | 10/1983 | United Kingdom . |
| 2125928 | 3/1984 | United Kingdom . |
| 2129397 | 5/1984 | United Kingdom . |
| 2141203 | 12/1984 | United Kingdom . |

Primary Examiner—R. Skudy
Attorney, Agent, or Firm—Fleit, Jacobson, Cohn & Price

[57] ABSTRACT

An electric motor and gearbox unit, wherein the gearbox comprises a casing having an integral bearing support for the motor shaft and an epicyclic gear train within the casing, the output shaft of the gearbox being precisely aligned with the motor shaft. The gearbox can be symmetrically designed with respect to the motor axis so that a fan mounted on the motor shaft can create a symmetrical flow of cooling air over the gearbox casing and into the motor. Preferably, the epicyclic gear train comprises a sun gear on the motor shaft, a ring gear integral with the gearbox casing, and a plurality of planet gears that mesh with the sun gear and the ring gear and which are each mounted for rotation with respect to a planet carrier connected to the output shaft of the gearbox. The planet carrier has to be provided with a number of holes, one being a central hole for receiving the output shaft of the gearbox and the others being for receiving stub axles for mounting the planet gears. One or more components of the gearbox, e.g. the sun gear and/or planet carrier, are formed from two or more stamped laminations which are secured together by being progressively stacked and part sheared.

7 Claims, 5 Drawing Sheets

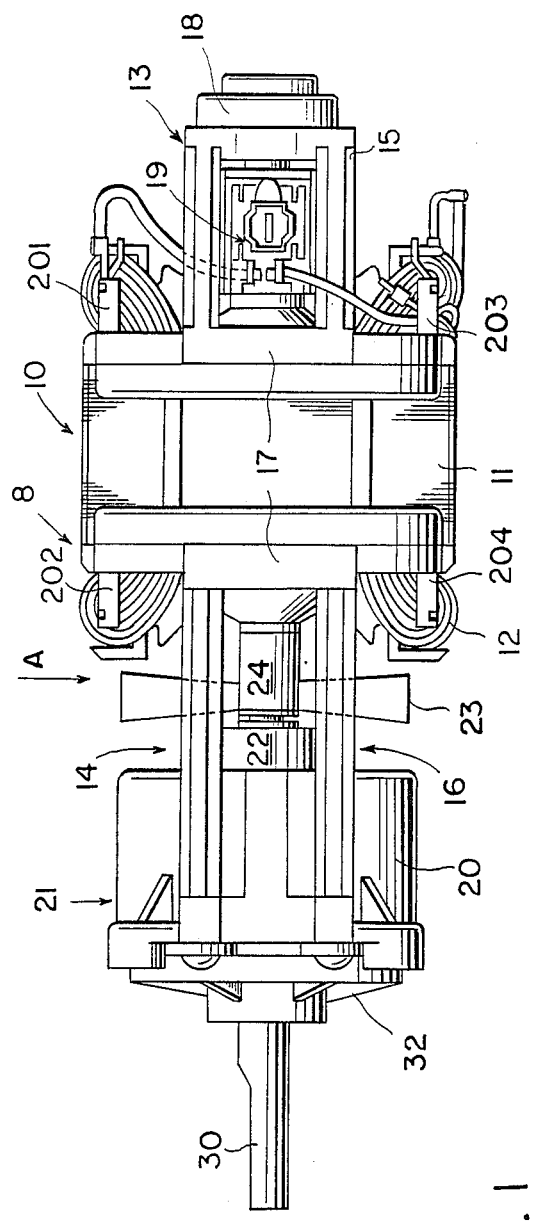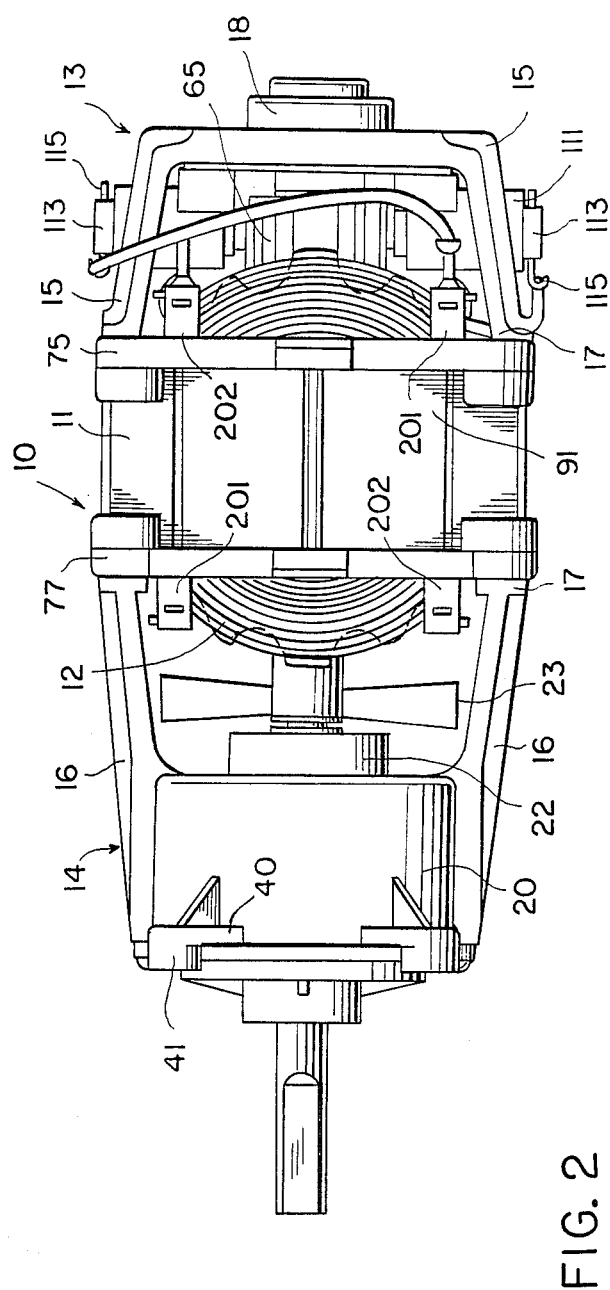

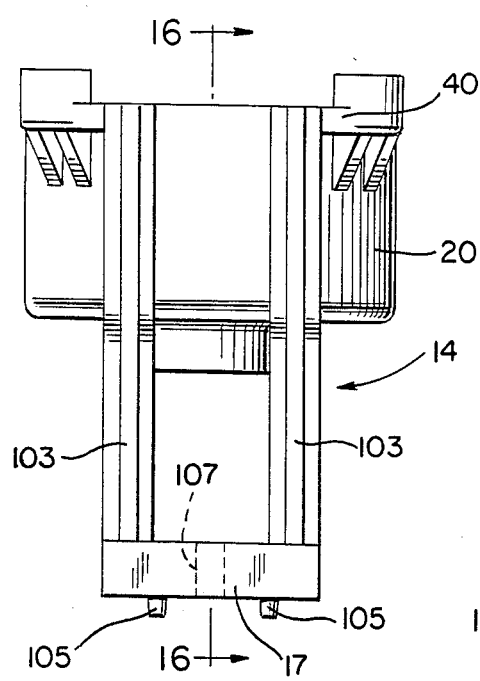
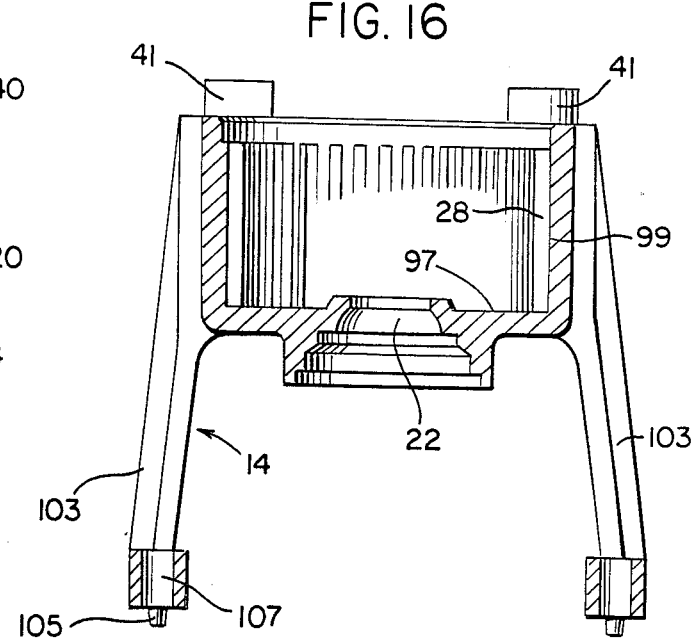
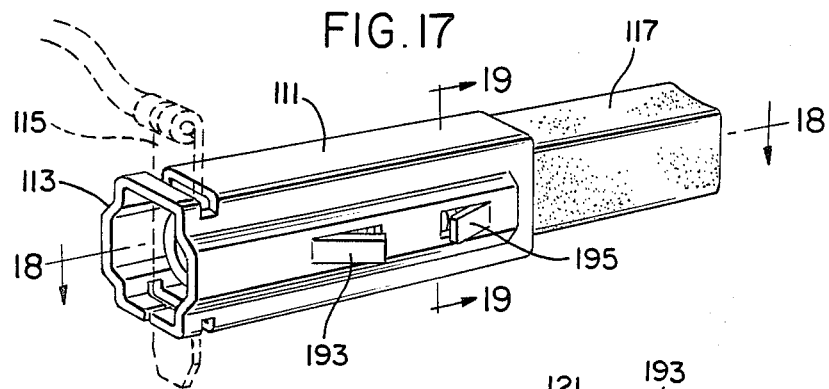
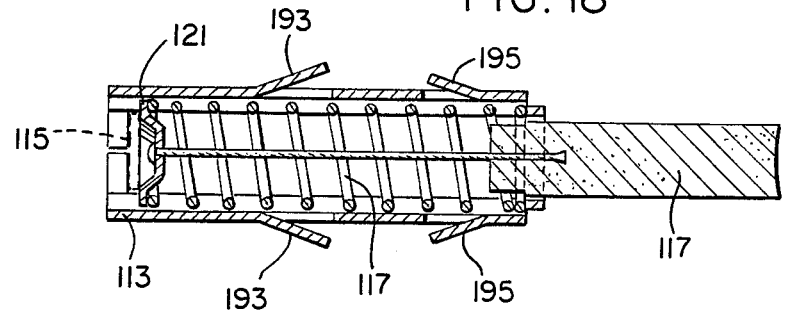
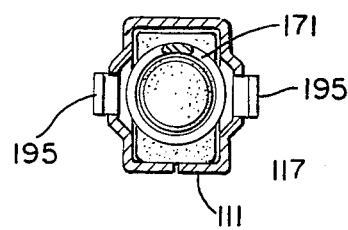

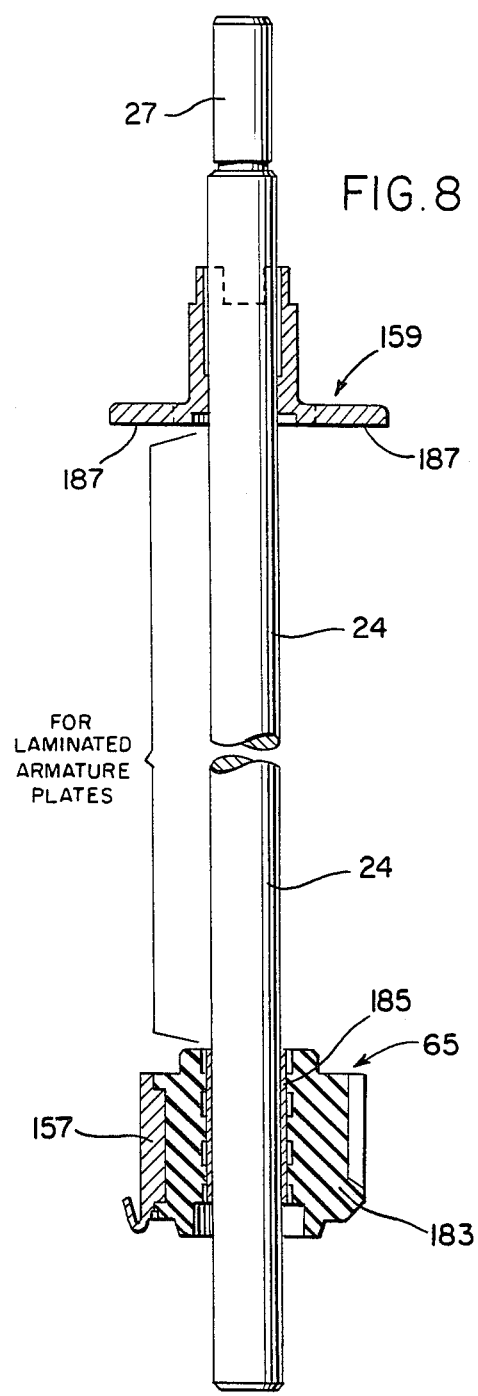
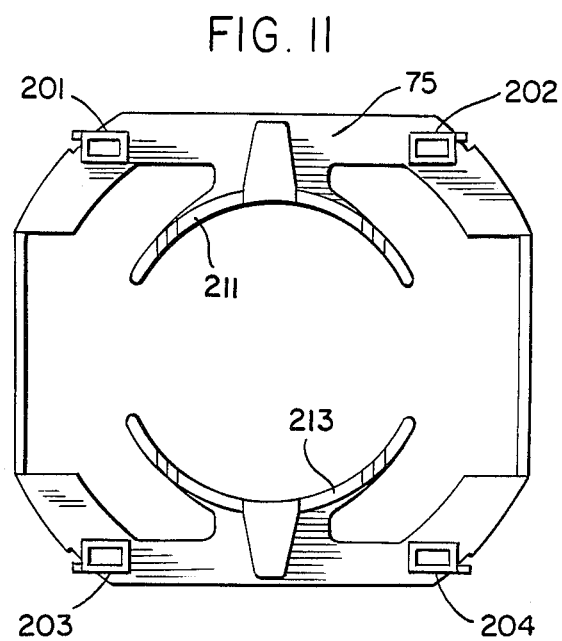
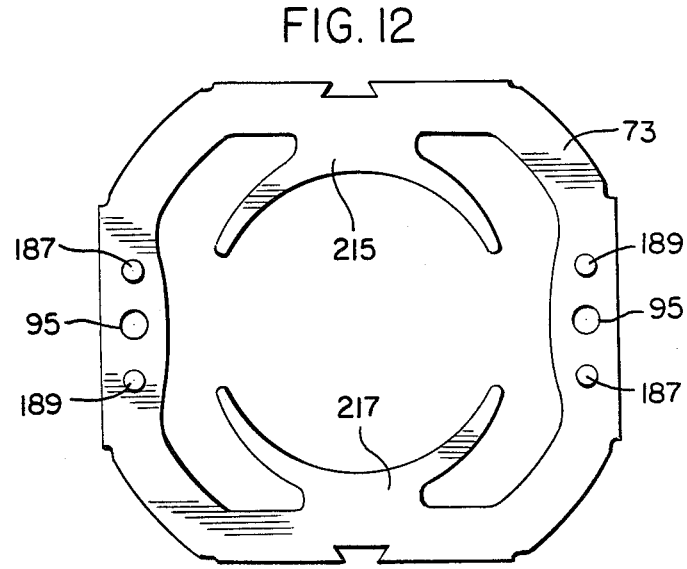
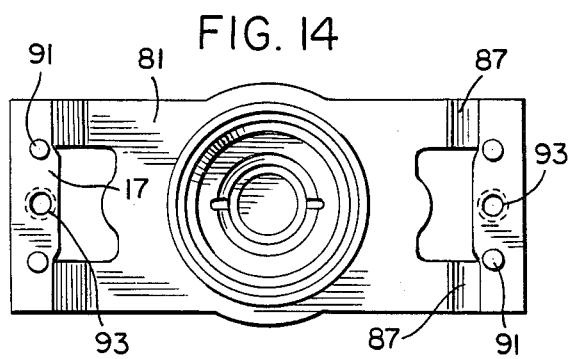
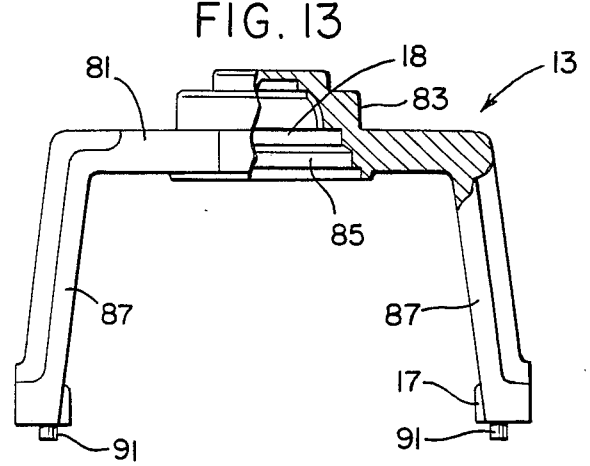

ELECTRIC MOTOR AND GEARBOX UNIT AND COMPONENT PARTS THEREOF

FIELD OF THE INVENTION

This invention relates to an a.c. or universal electric motor and gearbox unit, particularly but not exclusively for use in food processors, and to component parts thereof.

BACKGROUND OF THE INVENTION

It is known to provide an integrated universal electric motor and gearbox unit in which the casing of the gearbox has an integral bearing support for the motor shaft. In this known arrangement it is common to have a single stage reduction formed from spur gears. The spur gears usually have teeth formed in a helix to extend the area of tooth engagement and thereby reduce the tooth pressures. The nature of this known unit when used, for example, in a food processor tends to create progressive movement of the food processor along a work surface on which it is standing due to the axial accelerations caused by the stick/slip effects on the mating gears. Moreover, the casing of the gearbox projects radially beyond the confines of the motor itself. This increases the overall radial dimensions of the unit and interferes with the flow of cooling air drawn into the motor by a fan mounted on the motor shaft.

SUMMARY OF THE INVENTION

According to a first aspect of the present invention, there is provided an a.c. or universal electric motor and gearbox unit, wherein the gearbox comprises a casing having an integral bearing support for the motor shaft and an epicyclic gear train within the casing, the output shaft of the gearbox being precisely aligned with the motor shaft.

It is thus possible to provide a balanced unit in which the casing of the gearbox is kept generally within the confines of the motor, as considered in a radial direction with respect to the axis of the motor. Because the motor shaft and output shaft of the gearbox are aligned, the unit will minimize side loads which otherwise may cause an appliance provided with such a unit to progress along a work surface on which it is standing.

The gearbox can be symmetrically designed with respect to the motor axis so that a fan mounted on the motor shaft can create a symmetrical flow of cooling air over the gearbox casing and into the motor.

Preferably, the epicyclic gear train comprises a sun gear on the motor shaft, a ring gear integral with the gearbox casing, and a plurality of planet gears that mesh with the sun gear and the ring gear and which are each mounted for rotation with respect to a planet carrier connected to the output shaft of the gearbox.

Such a gearbox can provide good heat transfer from the sun gear to the gearbox casing because of the direct contact between the gears and the casing.

For ease and cheapness of manufacture, the gearbox casing is, preferably, a die casting, such as of an aluminum or zinc alloy. To keep noise to a minimum, the planet gears may be of plastics material. Whereas plastics material is not as good a heat conductor as metal, grease in the gearbox casing will ensure a good heat path from the sun gear to the casing. The shrink fit guarantees a holding force between the sun gear, the planet carrier and their respective shafts strong enough to withstand the shock and torque developed through operation of the motor and gearbox unit.

The sun gear and plane carrier could be press-fitted onto respective shafts. However, a shrink fit is preferred.

Machined parts are expensive to make. It is therefore desirable to make the planet carrier and sun gear from metal stampings which are far less expensive. However, it is common knowledge in the art that only sheet metal of up to a certain thickness can be stamped cleanly. Moreover the planet carrier has to be provided with a number of holes, one being a central hole for receiving the output shaft of the gearbox and the others being for receiving stub axles for mounting the planet gears.

The holes can be located relative to one another with a greater degree of precision to ensure perfect symmetry if they are all made circular. However, in this case, in order to transmit high torque there must be a good interference fit between the planet carrier and the output shaft of the gearbox. It is therefore most important that the central hole in the planet carrier is both clean and non-tapering.

In order to satisfy some or all of the above requirements, it is advantageous to form one or more components of the gearbox, e.g. the sun gear and/or planet carrier, from two or more stamped laminations which are secured together. The laminations can be secured together by what is commonly known as the Mac Die process by which the laminations are progressively stacked and part sheared. Indeed this process of making gearbox components is itself thought to be novel and consequently according to a second aspect of the present invention, a component part of a gearbox, e.g. a gear wheel or a planet carrier, comprises two or more stamped laminations or layers secured together.

By constructing the planet carrier and the sun gear from thin laminates held together by the Mac Die process of progressive stacking, and stamping the thin laminates from thin metallic sheets, the dimensions of the holes formed in the planet carrier and the sun gear may be produced within finer tolerances. Such construction provides a hold in the sun gear for receiving the drive shaft of the motor so that a high degree of perpendicularlity and concentricity are maintained between the sun gear and the drive shaft. The same may be said with regard to the output shaft in the central opening of the planet carrier and the stub axles in the other opening in the planet carrier.

The invention will now be more particularly described, by way of example, with reference to the accompanying drawings in which:

BRIEF DESCRIPTION OF THE DRAWINGS

FIG. 1 is a side elevation of one embodiment of a motor and gearbox unit, according to a first aspect of the invention.

FIG. 2 is a view taken in the direction of arrow A of FIG. 1.

FIG. 8 is a side view partialy in section of the motor shaft with the spider and commutator mounted thereon.

FIG. 11 is a plan view of a coil retainer used in the motor of FIG. 1.

FIG. 12 is a plan view of a field lamination used in the motor of FIG. 1.

FIG. 13 is a side view, partially cut away, of a frame used in the motor of FIG. 1.

FIG. 14 is a top view of the frame of FIG. 13.

FIG. 15 is a side view of another frame used in the motor of FIG. 1.

FIG. 16 is a view taken along lines 16—16 of FIG. 15.

FIG. 17 is a perspective view of a motor brush gear used in the motor of FIG. 1.

FIG. 18 is a view taken along lines 18—18 of FIG. 17.

FIG. 19 is a view taken along lines 19—19 of FIGS. 17.

DETAILED DESCRIPTION OF THE PREFERRED EMBODIMENTS

Figure 3:
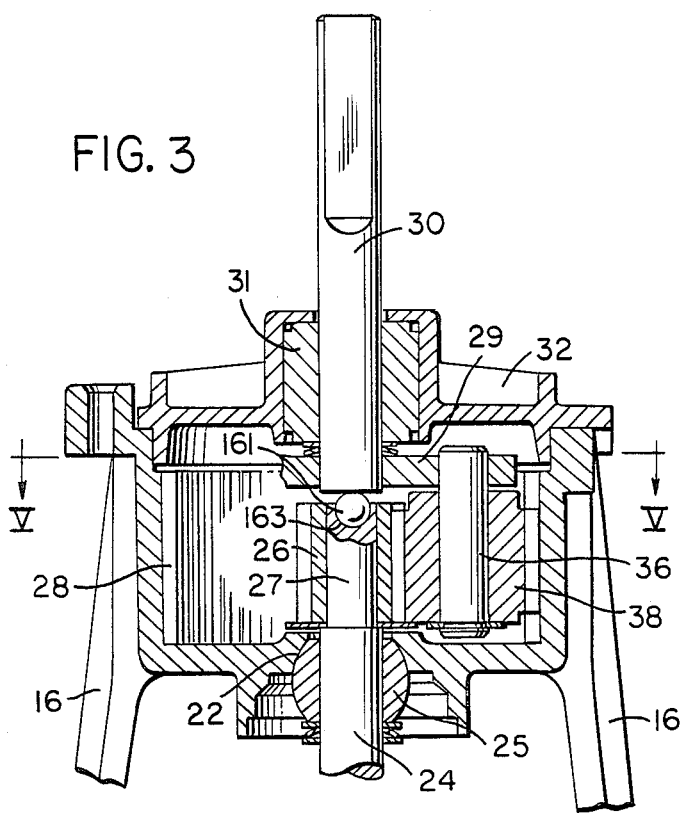
FIG. 3 is a sectional view of the gearbox and mounting bracket of the unit of FIGS. 1 and 2, on an enlarged scale.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 4:
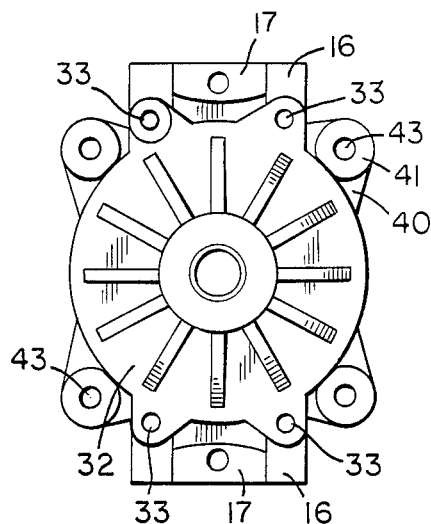
FIG. 4 is a top plan view of the gearbox and mounting bracket of FIG. 3.
Figure 7:
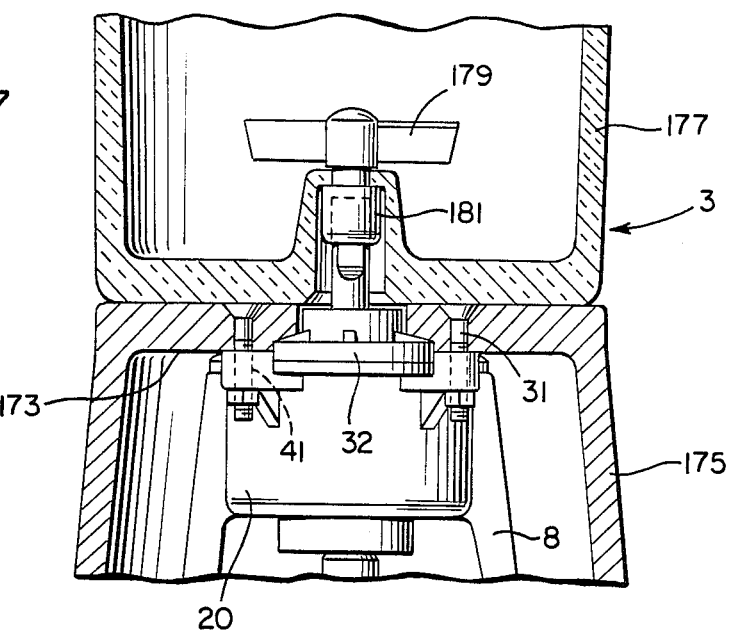
FIG. 7 is a schematic drawing of the motor and gearbox unit mounted in the base of a food processor.
Figure 10:
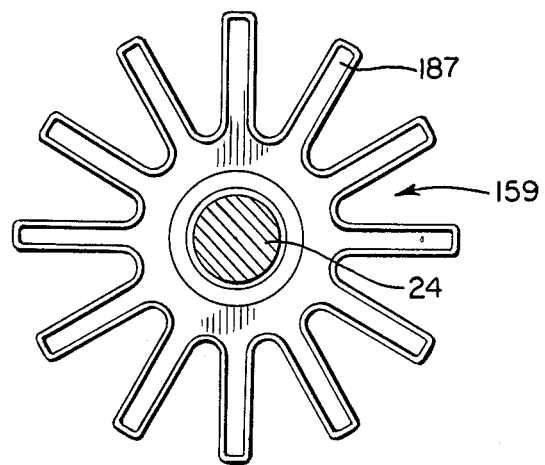
FIG. 10 is a view taken along lines 10—10 of FIG. 8.
Figure 9:
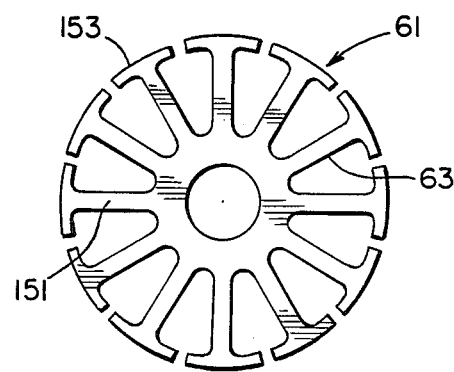
FIG. 9 is a plan view of an armature plate used to make the rotor of the motor of FIG. 1.

Referring to the drawings there is shown therein a universal motor and gearbox unit intended for use in a domestic food processor. Basically the motor and gearbox unit generally designated as 8 comprises a universal motor 10 having an output shaft 24 to which is attached a cooling fan blade 23. In a preferred embodiment the shaft is made from a metal, such as steel, and the fan blade is made from a plastic, such as polybutylene terephthalate. The output shaft continues to extend to within a casing 20 formed as part of an epicyclic gearbox 21 with an output shaft 30 emanating from the other side of the casing. As shown in FIGS. 4 and 7, the gearbox contains a lid 32 appropriately configured with a series of outstanding collars 41 which contain apertures 43 for receiving bolts 31 for mounting the motor gearbox unit 8 to the interior underside 173 of the base 175 of a food processor 3. The shaft 30 extends upward from the top of the base 175. A glass tumbler 177 includes a mixing blade 179 and connecting shaft 181 which operatively mates with the shaft 24 when the glass tumbler is positioned on the base of the top of the base 175. Although the motor gearbox unit is disclosed as being used in a food processor, it is to be understood that the motor gearbox unit may be used in other applications where precise alignment between the motor output shaft and the gearbox output shaft is required.

In a preferred embodiment, the motor 10 comprises a laminated rotor and laminated stator each with respective windings. As shown in FIGS. 1, 2, 9 and 10, the laminated rotor generally designated as 12 is made up of a series of armature plates 61 which are generally circular in configuration and are approximately 0.5 mm thick. Each of the armature plates contains 12 equally spaced slots 63 which receive the windings of the rotor. The slots 63 are defined by radial projections 151 that each terminate in a curved end portion 153. The armature plates are positioned along the motor shaft 24. At one end of the motor shaft, the commutator 65 is mounted. The commutator basically comprises a cylindrically shaped element 183 made of an insulation material such as melamine. Disposed about the element 183 are 24 commutator segments 157 that are made of a copper silver alloy. The cylindrical element 183 is secured to shaft 24 by force fit through the use of a brass insert 185. The other end of the rotor terminates in a spider 159 having an outwardly extending shaft portion. The spider contains 12 equally spaced legs 187 that are aligned with the 12 equally spaced projections 151 on the laminated rotor.

As shown in FIGS. 1, 2, 11 and 12, the laminated stator is basically made up of two elements. The first is a field lamination plate 73 which is shown in FIG. 12. Each of the plates is approximately 0.5 mm thick. An appropriate number of the plates are laminated together to give the stator its proper thickness. On either side of the stator is a coil retainer 75, 77, one such retainer being shown in FIG. 11.

The construction of the motor gearbox unit is completed by the presence of two frame parts 13 and 14, each comprising two generally U-shaped pillars 15 and 16, respectively, secured by web 17 to the laminated stator 71.

As shown in FIGS. 1, 13 and 14, frame part 13 is made up of a generally rectangular base portion 81 that contains a raised area 83 within which is defined an evacuated portion 85. This portion is configured in a step-wise fashion to accomodate one end of the motor shaft and provide a bearing support 18 for the motor. Each end of the rectangular base portion contains a downwardly and slightly outwardly extending leg 87 as shown in the orientation in FIG. 13. At the termination point of the leg is provided web 17 adjoining two of the more closely spaced legs together. The underside of the web contains guide projections 91 which mate with apertures 187 and 189 provided in the stator. Each web also contains an aperture 93 which receives a bolt that also passes through the aperture 95 (see FIG. 12) provided in the stator. In a preferred embodiment, the frame part 13 and the frame part 14 are made of an aluminium or zinc alloy.

Frame part 14 is located to the left of the motor as shown in FIG. 1. Frame part 14 basically consists of a casing 20 of cylindrically shaped interior. To this end, the interior of casing 20 has a planar base surface 97 and a cylindrically shaped interior wall 99, see FIG. 16. Disposed about the interior wall is a ring gear 28. The purpose of this ring gear will be described in greater detail hereinafter. The underside of the base portion terminates in a projection that defines a second stepwise bearing support 22 for the motor shaft. At opposite sides of the casing 20 a pair of legs 103 emanates downwardly and slightly outwardly as shown in FIG. 16. The ends of each pair of the more closely spaced legs are joined by web 17, the underside of which contains a pair of projections 105 that mate with the apertures 187 and 189 defined in the field lamination. An aperture 107 is also defined in the web portion and this receives the end of the screw after it has passed through the field laminations in order to join the field lamination structure, the coil retainers and the frame portions together to define the basic structure of the gear box and motor unit.

The frame part 13 also supports motor brush gear designated by the general reference numeral 19. With reference to FIGS. 17 through 19, each of the motor brush gear supports includes a housing 111 that terminates at one end in an upper portion 113 that receives a terminal 115. Positioned within the housing is a carbon brush 117 to which is secured a shunt wire 119. The end of the shunt wire is soldered to a tin plated brass plate 121. Disposed between the brass plate and the carbon brush is a helical spring 171. The brush assembly is placed within the housing 111 so that the end of the carbon brush makes electrical contact with the commutator 65 and the brass plate makes contact with the terminal 115.

The frame part 14 is formed integrally with a casing 20 of the epicyclic gearbox 21 and the other bearing support 22 of the motor.

As shown best in FIG. 3, the motor shaft 24 extends into the gearbox casing or housing 20 and is supported for rotation in a bearing 25 seated in the bearing support 22. A sun gear 26 having a bore is a shrink fit on a reduced diameter end portion 27 of the motor shaft 24 and the ring gear 28 is provided as an integral part of the die cast casing 20. A planet carrier 29 is a shrink fit on an output shaft 30 of the gearbox. The output shaft 30 is mounted for rotation in a bearing 31 seated in the die-cast gearbox lid 32 which is attached to the gearbox casing 20 by four threaded bolts 33. A ball bearing 161 is set in a seat 163 defined at one end of shaft 27 to take up any play between shafts 27 and 30. The longitudinal axis of the output shaft lies along the same axis as the longitudinal axis of the drive shaft.

Figure 5:
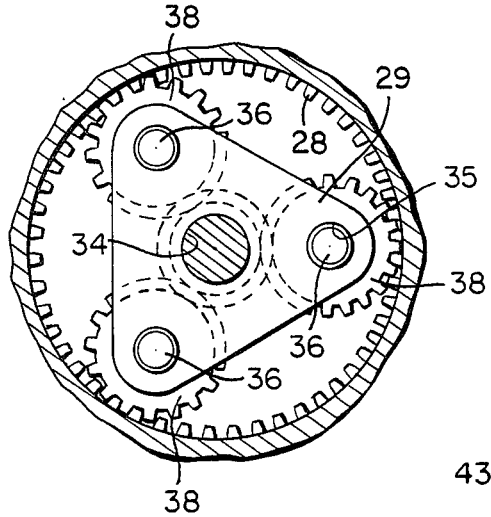
FIG. 5 is a section taken along the lines 5—5 of FIG. 3.

As best shown in FIG. 5, the planet carrier 29 is a planar disk with a periphery of generally triangular shape and has a central circular hole 34 for receiving the output shaft 30 and three circular holes 35 positioned near the corners of the triangular shape for receiving stub axles 36 for planet gears 38 (see FIG. 3). The planet carrier 29 need not be generally triangular but it is thought that a non-circular configuration facilitates expansion of the central hole 34 for shrink fitting purposes.

There are three planet gears 38 mounted on respective stub axles 36. The planet gears 38 are, conveniently, of a plastics material, such as Delran, (Trademark) and mesh with the sun gear 26 and the ring gear 28. The planet gears 38 are held on respective stub axles 36 by washers 39 which are a press fit on the bottom part of the axles 36. The planetary gears are operatively intermeshed between the ring gear and the sun gear.

The casing 20 has four apertured wing portions 40 each provided with an integral upstanding collar 41 to allow the unit to be secured in place in the body of a food processor with threaded fasteners 31 as shown in FIG. 7.

For easy and economical manufacture, the planet carrier 29 and sun gear 26 each comprises a plurality of planet stamped laminations or gear layers of which adjacent layers are secured together. Typically, the motor 10 consumes about 500 watts of electrical power and produces about 300 watts of output power at the output shaft 30, the gearbox having a typical stepdown ratio of 4.9:1. In order to transmit this torque from the planet carrier 29, heat shrunk on the output shaft 30 the planet carrier needs to have a thickness of about 4 mm. It has also been found possible to stamp metal plate of 2 mm thickness with clean and non-tapering holes. Consequently, the planet carrier 29 is typically constituted by two stamped laminations. The sun gear 26, however, has many more.

Figure 6:
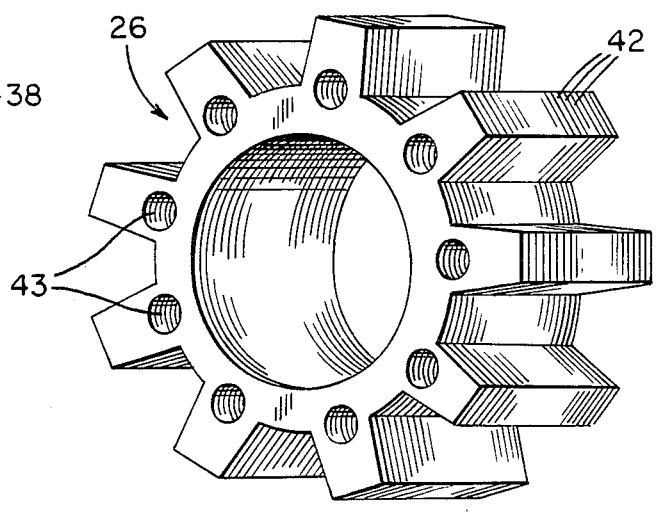
FIG. 6 is a schematic enlarged view of the sun gear of the gearbox.

A typical example of a laminated sun or pinion gear 26 is shown in FIG. 6. The sun gear has a plurality of laminations 42 each of which is stamped from metal plate. In a preferred embodiment, the metal plate is made of steel. One of the laminations is then introduced between male and female dies and a plurality of, for example, circular portions 43 are half sheared from the plate to protrude from one surface thereof. This process is repeated introducing one further lamination at a time to gradually stack and secure the laminations together.

The unit described above thus has an integrated motor and gearbox, is of symmetrical balanced design, can be cooled efficiently, and is relatively inexpensive and easy to make.

Although the motor 10 is said to be a universal motor it could be an a.c. motor. Moreover the motor/gearbox unit described above could have uses in other than food processors.

From the above, it is apparent that many modifications and variations of the present invention are possible in light of the above teachings. It is therefore to be understood that, within the scope of the appended claims, the invention may be practiced otherwise than as specifically described.

What is claimed is:

1. A motor/gearbox unit comprising:
   an electric motor having an elongated drive shaft, a laminated stator, a laminated rotor on the drive shaft, and two frame parts, each frame part including two pillars secured to the stator, one of the frame parts defining bearing support for the motor, the other of the frame parts being formed integrally with a housing for the gearbox and a second bearing support for the motor;
   the housing having a cylindrically shaped interior side wall concentric about a housing axis;
   a ring gear disposed about said interior side wall;
   a sun gear positioned within said housing to rotate about said housing axis, said sun gear having a bore for receiving the drive shaft of said motor;
   a plurality of planetary gears operatively intermeshed between said ring gear and said sun gear;
   gear carrier means having a central bore, said gear carrier means rotatably carrying said planetary gears; and
   an output shaft having one end fixedly positioned within said carrier means, said output shaft having a longitudinal axis perpendicular to the surface of said carrier means, wherein the output shaft of said gearbox is coaxially aligned with the drive shaft of said motor.

2. The motor/gearbox of claim 1, wherein said sun gear comprises a plurality of planar gear layers and securing means for joining adjacent layers together.

3. The motor/gearbox of claim 2, wherein said securing means comprises a plurality of half-sheared indentations disposed about the surfaces of said gear layers.

4. The motor/gearbox of claim 1, wherein said gear carrier means comprises:
   a planar disk with a periphery of predetermined configurations;
   said central bore and a plurality of peripheral bores disposed about said central bore being defined on said disk; and a plurality of axes, each of said axes being fixedly mounted in one of said peripheral bores, rotatably carrying one of said planetary gears.

5. The motor/gearbox of claim 4, wherein said periphery is triangular shaped and said peripheral bores are positioned near the corners of each triangle.

6. The motor/gearbox of claim 1, wherein said gear carrier means includes a planar disk with a periphery of predetermined configuration, said disk comprising a plurality of planar gear layers and securing means for joining adjacent layers together.

7. The motor/gearbox of claim 1, further comprising a fan blade mounted on said drive shaft between said housing and said motor for drawing air over said housing and into said motor.

* * * * *